July 6, 1965     C. W. BAXTER ETAL     3,193,709
VOLTAGE MONITORING AND CONTROLLING DEVICE
Filed Jan. 3, 1961
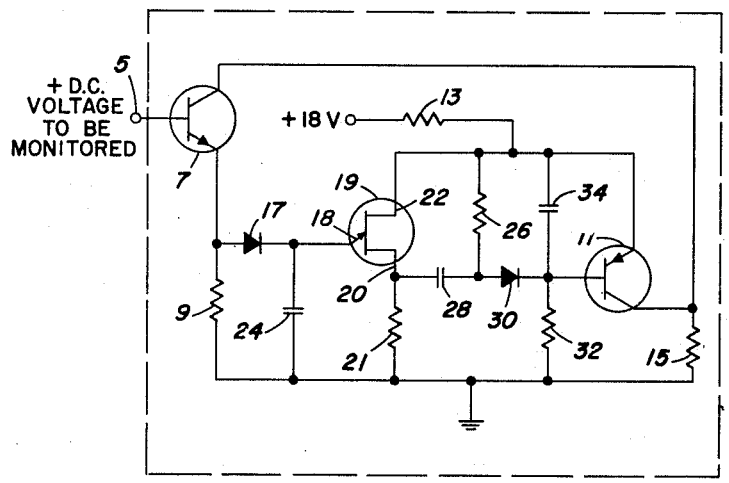
INVENTORS
CLYDE W. BAXTER
EUGENE C. SENTI
BY
ATTORNEYS

United States Patent Office 3,193,709
Patented July 6, 1965

3,193,709
VOLTAGE MONITORING AND CONTROLLING DEVICE
Clyde W. Baxter, Orlando, Fla., and Eugene C. Senti, Cedar Rapids, Iowa, assignors to Collins Radio Company, Cedar Rapids, Iowa, a corporation of Iowa
Filed Jan. 3, 1961, Ser. No. 80,144
4 Claims. (Cl. 307—100)

This invention relates to a voltage monitoring and controlling device and more particularly to an electronic device for sensing a direct voltage and diverting the same to ground should said voltage exceed a predetermined magnitude.

It is oftentimes desirable in electronic circuitry to monitor a direct voltage and provide compact yet reliable means to assure that said voltage will never exceed a predetermined magnitude. The monitoring device of this invention provides an improved network for accomplishing this purpose and is particularly adapted, though not restricted, to use in conjunction with a high impedance line.

The monitoring device of this invention may be used directly, or with slight modification that would be readily apparent to one skilled in the art, to monitor any direct voltage. One such use, for example, might be to monitor a direct frequency control voltage that is applied to a high frequency oscillator to adjust the resonant frequency of the oscillator. The use of the voltage monitoring and controlling device of this invention for this purpose is described and claimed in combination in U.S. patent application No. 80,317, entitled "Frequency Stabilizing network," filed January 3, 1961, by Clyde W. Baxter and David W. Weber and assigned to the assignee of the present invention.

It is therefore an object of this invention to provide an improved electronic voltage monitoring and controlling device that is simple and compact but yet reliable in operation.

It is also an object of this invention to provide a transistorized voltage monitoring and controlling device utilizing a unijunction transistor to assure that the voltage monitored will never exceed a predetermined magnitude.

It is a further object of this invention to provide a simple, yet reliable, monitoring device that is particularly adapted for use with a high impedance line to divert a monitored direct voltage to ground should said voltage exceed a predetermined magnitude.

With these and other objects in view which will become apparent to one skilled in the art as the description proceeds, this invention resides in the novel construction, combination and arrangement of parts substantially as hereinafter described and more particularly defined by the appended claims, it being understood that such changes in the precise embodiment of the herein disclosed invention may be included as come within the scope of the claims.

The accompanying drawing illustrates one complete example of the embodiment of the invention constructed according to the best mode so far devised for the practical application of the principles thereof, and in which the single figure shown is a schematic presentation of the voltage monitoring and controlling device of this invention.

Referring now to the drawing, the numeral 5 indicates an input terminal to which a positive direct voltage to be monitored may be coupled. As shown in the drawing this voltage may be directly coupled to the base of NPN type transistor 7, which transistor may be connected as an emitter follower and may have its emitter connected to ground through resistor 9. The collector of transistor 7 may, for purposes to be brought out hereinafter, be connected through PNP type transistor 11 and resistor 13 to a source of direct voltage, preferably 18 volts. In addition, also for purposes to be brought out hereinafter, the collector of transistor 7 may be returned to ground through resistor 15.

It is to be appreciated, of course, that circuit modifications obvious to one skilled in the art might be made without departing from the scope of this invention, such as, for example, utilizing a PNP type transistor in lieu of NPN type transistor shown and described as transistor 7 should the direct voltage monitored be negative. It is also to be appreciated that by applying the monitored voltage directly to a transistor the voltage monitoring and controlling device of this invention can be readily used in conjunction with a high impedance line.

As stated hereinabove, transistor 7 is connected as an emitter follower, and as shown in the drawing may have a diode 17 connected between its emitter and emitter 18 of unijunction transistor 19. Unijunction transistor 19, in turn, may have one base 20 connected to ground through resistor 21 and the other base 22 connected to the D.C. power source through resistor 13. In addition, a by-pass capacitor 24 may be connected between diode 17 and emitter 18 if desired.

As is known in the art, a unijunction transistor is a device which permits conduction between its bases only when a voltage of predetermined magnitude is impressed upon its emitter. When this occurs, there is immediate conduction between the bases. As shown in the drawing, the signal developed across resistor 21 (which signal will be positive at the junction of base 20 and resistor 21) may be coupled to the base of PNP transistor 11 through capacitor 28 and diode 30. An R-C time constant may be provided to control the cut-off time of transistor 11 comprising resistor 32, connected between the base of transistor 11 and ground, and capacitor 34, connected between the base of transistor 11 and the junction between resistor 13 and the emitter of transistor 11.

Particular component values which have been found to provide a working model of the herein described invention are as follows:

| Numeral | Type | Value |
|---|---|---|
| 7 | NPN Transistor | 2N541. |
| 9 | Resistor | 470K ohms. |
| 11 | PNP Transistor | 2N1224. |
| 13 | Resistor | 10K ohms. |
| 15 | do | 22K ohms. |
| 17 | Diode | 1N198. |
| 19 | Unijunction Transistor | 2N489. |
| 21 | Resistor | 220 ohms. |
| 24 | Capacitor | 1.8 µf. |
| 26 | Resistor | 4,700 ohms. |
| 28 | Capacitor | 40 µf. |
| 30 | Diode | 1N457. |
| 32 | Resistor | 100K ohms. |
| 34 | Capacitor | 4.5 µf. |

It is to be appreciated, of course, that the foregoing are merely illustrative and this invention is not meant to be restricted to the particular components or values listed hereinabove.

In operation, when a positive direct voltage less than the predetermined limiting magnitude desired is impressed upon the base of transistor 7 (normal operating condition), the device of this invention merely monitors the voltage but does not divert the same to ground. During this normal operating condition, the collector of transistor 7 has impressed thereon a voltage substantially equal to the power supply voltage (+18 volts), since transistor 11 is normally saturated, so that transistor 7 presents a high impedance input so long as this condition exists. As the input voltage to the base of transistor 7 varies, the emitter voltage follows (the transistor has nearly unity gain), and if the voltage of emitter 18 should reach the predetermined desired limiting magnitude determined by unijunction transistor 19 and its selected associated circuitry (about 10 volts utilizing the circuitry components listed hereinabove), conduction will immediately occur between the bases of the unijunction transistor to terminate the normal operating condition. This will develop a sharp spike of voltage across resistor 21, (positive at base 20) which voltage will be coupled through diode 30 to the base of normally conductive PNP type transistor 11 to immediately render it non-conductive. Since the collector of transistor 7 is connected through transistor 11 to the power source, when transistor 11 cuts off the collector voltage of transistor 7 drops (to about +1 volt) and causes the base-collector junction of transistor 7 to be forward-biased so that the monitored voltage is immediately diverted through the base-collector junction of transistor 7 and resistor 15 to ground. The time constant of resistor 32 and capacitor 34 is such that transistor 11 is maintained in a non-conductive state for a predetermined length of time (about one-half second with the components listed in this specification). When transistor 11 again becomes conductive, monitoring will again occur and until the direct voltage monitored exceeds the predetermined maximum level, the voltage will merely be sensed and not diverted to ground. Of course if the voltage has not dropped below the predetermined maximum level, transistor 11 will again revert to a non-conductive state to again cause the base-collector junction of transistor 7 to be forward biased.

It should be obvious from the foregoing to one skilled in the art that the voltage monitoring and shorting system of this invention provides an improved voltage monitoring and controlling device that is simple and compact, but yet is reliable in sensing the monitored voltage and diverting said voltage and diverting said voltage to ground if a predetermined level is exceeded.

What is claimed as our invention is:

1. An electronic automatic level detector comprising: an electron control device for receiving a direct voltage to be monitored; a unijunction transistor connected to said electron control device for sensing the magnitude of said direct voltage coupled through said electron control device, said unijunction transistor producing an output only when said direct voltage exceeds a predetermined magnitude; and voltage diverting means connected to said unijunction transistor to cause said monitored direct voltage to be grounded through said electron control device whenever an output is provided from said unijunction transistor.

2. The automatic level detector of claim 1 wherein said electron control device is a transistor having its base adapted to receive said direct voltage, its emitter connected to said unijunction transistor for coupling said direct voltage thereto and its collector connected with said voltage diverting means.

3. An electronic automatic level detector comprising: a first transistor having three electrodes one of which is adapted to receive a direct voltage to be monitored; a unijunction transistor having its emitter connected to a second electrode of said first transistor for receiving said direct voltage coupled therethrough, said unijunction transistor assuming a conductive state only if the direct voltage from said first transistor exceeds a predetermined magnitude; a second and normally conductive transistor connected to said unijunction transistor and responsive to conduction thereof for rendering said second transistor non-conductive; and means connecting said second transistor with the third electrode of said first transistor and with ground whereby when said second transistor is rendered non-conductive said monitored direct voltage is diverted to ground through the first and third electrodes of said first transistor.

4. An automatic level detector comprising: an electron control device adapted to receive a direct voltage to be monitored; sensing means connected to receive said direct voltage after said direct voltage has been coupled through said electron control device and sensing the magnitude of said voltage coupled therethrough, said sensing means developing an output voltage only when said direct voltage exceeds a predetermined magnitude; and means connected to said sensing means for receiving said output voltage and responsive thereto causing said direct voltage to be diverted to ground through said electron control device when said direct voltage exceeds said predetermined magnitude.

References Cited by the Examiner

I.B.M. Technical Disclosure, vol. 2, No. 4, December 1959, Overload Protective Circuit, P. Essinger.

MILTON O. HIRSHFIELD, *Primary Examiner.*

LLOYD McCOLLUM, *Examiner.*